(12) United States Patent
Friedman et al.

(10) Patent No.: US 12,347,460 B1
(45) Date of Patent: Jul. 1, 2025

(54) SYSTEMS AND METHODS FOR PRESENTING WIDE VIDEOS

(71) Applicant: GoPro, Inc., San Mateo, CA (US)

(72) Inventors: Bruce Friedman, Reno, NV (US); Daryl Stimm, Encinitas, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 107 days.

(21) Appl. No.: 18/361,557

(22) Filed: Jul. 28, 2023

Related U.S. Application Data

(60) Provisional application No. 63/393,626, filed on Jul. 29, 2022.

(51) Int. Cl.
| | | |
|---|---|---|
| G11B 27/00 | (2006.01) | |
| G06F 3/0482 | (2013.01) | |
| G06F 3/04847 | (2022.01) | |
| G11B 27/031 | (2006.01) | |
| G11B 27/10 | (2006.01) | |
| H04N 5/91 | (2006.01) | |
| H04N 5/93 | (2006.01) | |

(52) U.S. Cl.
CPC .......... G11B 27/031 (2013.01); G06F 3/0482 (2013.01); G06F 3/04847 (2013.01); G11B 27/10 (2013.01)

(58) Field of Classification Search
CPC .......... G11B 27/00; G11B 27/10; H04N 5/91; H04N 5/93
USPC .......... 386/282, 278, 280, 239, 248
See application file for complete search history.

(56) References Cited

U.S. PATENT DOCUMENTS

| | | | |
|---|---|---|---|
| 2007/0260986 A1* | 11/2007 | Cristofoli | H04N 21/4314 348/E5.112 |
| 2017/0180626 A1* | 6/2017 | Hayashi | H04N 23/661 |
| 2019/0364204 A1* | 11/2019 | Wozniak | G06T 11/003 |
| 2024/0089311 A1* | 3/2024 | Soodeen | G06V 10/25 |

* cited by examiner

Primary Examiner — Daquan Zhao
(74) Attorney, Agent, or Firm — Esplin & Associates, PC

(57) ABSTRACT

A video having a wide field of view (e.g., spherical field of view) may be presented within a graphical user interface. The graphical user interface may include multiple punchouts of the wide field of view, with the number of punchouts set based on user interaction with a punchout-number element of the graphical user interface. Individual punchouts may be used as output of a virtual camera to provide views of differential spatial parts of the video. Presentation of different spatial parts of the video within different punchouts may be automatically synchronized based on the different spatial parts originating from a single video.

20 Claims, 8 Drawing Sheets

402

404

406

408

SYSTEMS AND METHODS FOR PRESENTING WIDE VIDEOS

FIELD

This disclosure relates to an interface that presents videos with wide field of view.

BACKGROUND

A video may have a wide field of view (e.g., spherical field of view). The wide field of view of the video may make it difficult to see different spatial parts of the video at the same time.

SUMMARY

This disclosure relates to presenting wide videos. Video information and/or other information may be obtained. The video information may define a wide field of view video. The wide field of view video may have a progress length. A graphical user interface may be presented on a display. The graphical user interface may include a display section. The display section may include presentation of one or more punchouts of the wide field of view video. The graphical user interface may further include a punchout-number element. The punchout-number element may enable setting of a number of punchouts in the display section. User interaction with the punchout-number element to set the number of punchouts in the display section may be received. The display section may be modified to include presentation of the number of punchouts of the wide field of view video set based on the user interaction with the punchout-number element.

A system for presenting wide videos may include one or more electronic storage, processor, and/or other components. The electronic storage may store video information, information relating to a video, information relating to punchouts of the video, information relating to a graphical user interface, information relating to modification of the graphical user interface, and/or other information.

The processor(s) may be configured by machine-readable instructions. Executing the machine-readable instructions may cause the processor(s) to facilitate presenting wide videos. The machine-readable instructions may include one or more computer program components. The computer program components may include one or more of a video component, a graphical user interface component, a user interaction component, a modification component, and/or other computer program components.

The video component may be configured to obtain video information and/or other information. The video information may define a video. The video may have a progress length. The video may include a wide field of view video. In some implementations, the wide field of view video may include a spherical video having a spherical field of view.

The graphical user interface component may be configured to present a graphical user interface. The graphical user interface may be presented on one or more displays. The graphical user interface may include a display section and/or other sections. The display section may include presentation of one or more punchouts of the video (e.g., the wide field of view video). The graphical user interface may further include a punchout-number element and/or other interface elements. The punchout-number element may enable setting of a number of punchouts in the display section.

In some implementations, the graphical user interface may further include a view direction element. The view direction element may enable setting of a direction of a given punchout of the video (e.g., the wide field of view video) included in the display section. The view direction element may provide options to select the direction of the given punchout to be in a front direction, a back direction, a right direction, a left direction, a top direction, a bottom direction, a custom direction, and/or other direction.

In some implementations, the graphical user interface may further include a full-view element. The full-view element may enable change in the display section from including presentation of multiple mini-view punchouts of the video (e.g., the wide field of view video) to including presentation of a full-view punchout of the video. During the presentation of the full-view punchout of the video, function of the punchout-number element may change from enabling setting of the number of multiple mini-view punchouts of the video to enabling setting of a number of inset-view punchouts of the video. The inset-view punchouts of the video may be positioned in front of the full-view punchout of the video.

The user interaction component may be configured to receive user interaction one or more interface elements of the graphical user interface. The user interaction component may be configured to receive user interaction with the punchout-number element to set the number of punchouts in the display section. In some implementations, the user interaction component may be configured to receive user interaction with the view direction element to set the direction of the given punchout of the video included in the display section. In some implementations, the user interaction component may be configured to receive user interaction with the full-view element to change the display section from including presentation of multiple mini-view punchouts of the video to including presentation of the full-view punchout of the video.

The modification component may be configured to modify the graphical user interface. The modification component may be configured to modify the display section and/or other sections. The modification component may be configured to modify the display section to include presentation of the number of punchouts of the video set based on the user interaction with the punchout-number element and/or other information. In some implementations, the modification component may be configured to modify the direction of the given punchout of the video included in the display section based on the user interaction with the view direction element and/or other information. In some implementations, the modification component may be configured to modify the display section to change from including presentation of multiple mini-view punchouts of the video to including presentation of full-view punchout of the video based on the user interaction with the full-view element and/or other information.

In some implementations, playback of multiple punchouts of the video (e.g., the wide field of view video) may be synchronized.

In some implementations, individual punchouts of the video (e.g., the wide field of view video) included in the display section may be selectable and/or editable as separate videos for inclusion in one or more video edits. In some implementations, the display section may include a first punchout of the video, a second punchout of the video, and/or other punchouts of the video. Selection of a segment of the first punchout of the video for inclusion in a video edit may not result in selection of a corresponding segment of the second punchout of the video for inclusion in the video edit. Modification of the segment of the first punchout of the video for inclusion in the video edit may not result in modification of the corresponding segment of the second punchout of the video for inclusion in the video edit.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
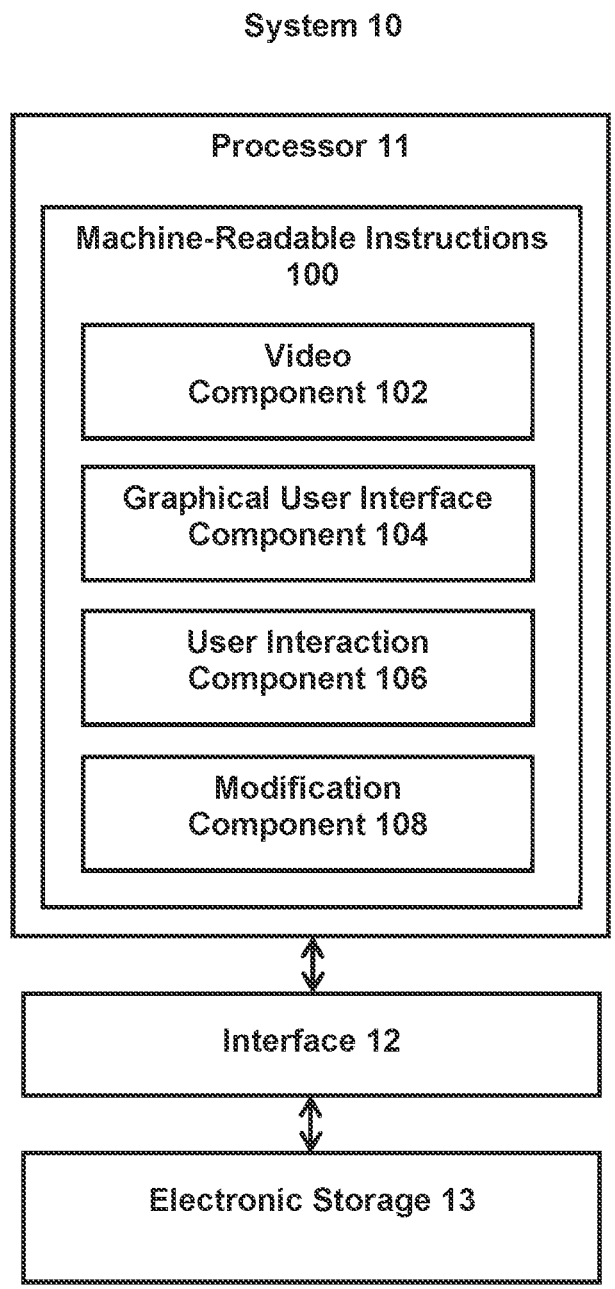
FIG. 1 illustrates a system for presenting wide videos.

FIG. 1 illustrates a system 10 for presenting wide videos. The system 10 may include one or more of a processor 11, an interface 12 (e.g., bus, wireless interface), an electronic storage 13, and/or other components. Video information and/or other information may be obtained by the processor 11. The video information may define a wide field of view video. The wide field of view video may have a progress length. A graphical user interface may be presented on a display by the processor 11. The graphical user interface may include a display section. The display section may include presentation of one or more punchouts of the wide field of view video. The graphical user interface may further include a punchout-number element. The punchout-number element may enable setting of a number of punchouts in the display section. User interaction with the punchout-number element to set the number of punchouts in the display section may be received by the processor 11. The display section may be modified by the processor 11 to include presentation of the number of punchouts of the wide field of view video set based on the user interaction with the punchout-number element.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to punchouts of the video, information relating to a graphical user interface, information relating to modification of the graphical user interface, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting wide videos. The machine-readable instructions 100 may include one or more computer program components. The machine-readable instructions 100 may include one or more of a video component 102, a graphical user interface component 104, a user interaction component 106, a modification component 108, and/or other computer program components.

The video component 102 may be configured to obtain video information and/or other information. Obtaining video information may include one or more of accessing, acquiring, analyzing, capturing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor, a processor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define one or more videos video. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

A video may have a field of view. A field of view of a video may refer to a field of view of a scene captured within the video (e.g., within video frames). A field of view of a video may refer to the extent of a scene that is captured within the video. In some implementations, the field of view of a video may be greater than or equal to 180-degrees. In some implementations, the field of view of a video may be smaller than or equal to 180-degrees.

In some implementations, a video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. Other fields of view of videos are contemplated. A wide field of view video may include and/or may be associated with spatial audio.

Visual content (of image(s), of video frame(s), of video (s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content of one or more videos may be referred to as video content. Video content may include visual content, audio content, and/or other content. For example, video content may include visual content viewable as a function of progress through the video progress length of the video content, audio content playable as a function of progress through the video progress length of the video content, and/or other content that may be played back as a function of progress through the video progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame (s) may define/contain visual content viewable as a function of progress through the video progress length of the video content. A video frame may include an image of the video content at a moment within the video progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may be stored in one or more formats and/or one or more containers. Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The graphical user interface component 104 may be configured to present one or more graphical user interfaces. The graphical user interface(s) may be presented on one or more displays. A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

A graphical user interface may include one or more sections. A section may refer to a particular spatial part of the graphical user interface. For example, a graphical user interface may be divided into multiple sections. A graphical user interface may include a display section and/or other sections. The display section may include presentation of one or more punchouts of a video. A punchout of a video may refer to an output of one or more spatial portions of the video for presentation (e.g., current presentation, future presentation based on video generated using the punchout). A punchout of a video may refer to a spatial extent of the visual content of the video that is obtained for viewing and/or extraction. Different punchouts of a video may include different extents of the visual content to provide views of different spatial parts of the video.

A punchout of a video may include output of a virtual camera. A virtual camera may define one or more spatial extents of the video to be output (e.g., for presentation, for storage) based on orientation of the virtual camera with respect to the visual content of the video. A virtual camera may represent the point of view from which different spatial extents of the video are observed. Different punchouts of a video may include outputs of different virtual cameras to provide views of differential spatial parts of the video. Spatial extents of a single video included within different punchouts may be treated as different videos. For example, spatial extents of a single video included within different punchouts may be represented, defined, stored, manipulated, and/or otherwise interactable within different video tracks.

An interface element of a graphical user interface may refer to a graphical element of the graphical user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include a punchout-number element and/or other interface elements. The punchout-number element may refer to an interface element that visually represents the number of punchouts of a video that is presented within the display section. The punchout-number element may refer to an interface element that is interactable by a user to input/control the number of punchouts of a video that is presented within the display section. That is, the punchout-number element may enable setting of the number of punchouts in the display section.

Figure 3A:
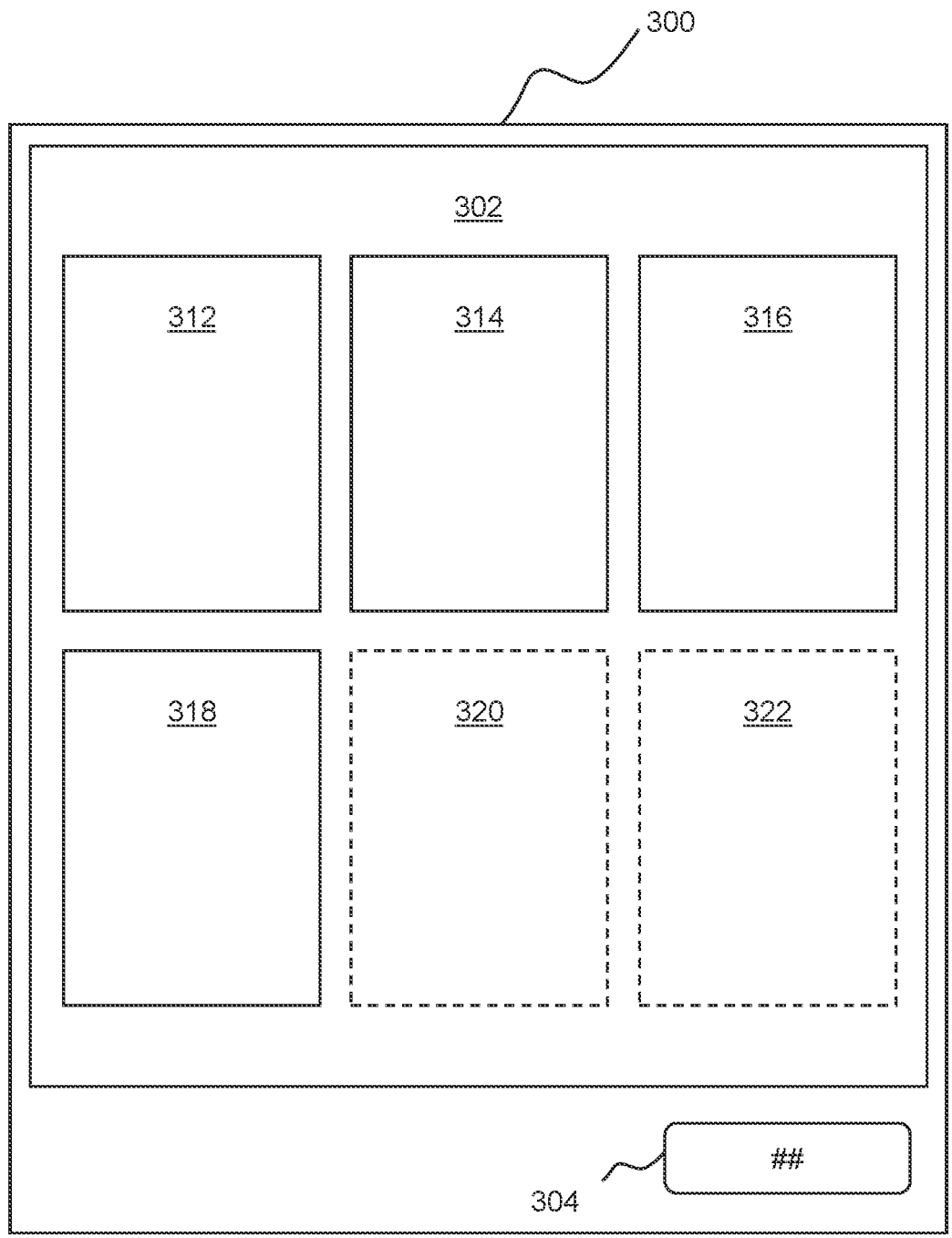
FIG. 3A illustrates an example view of a graphical user interface.
Figure 3B:
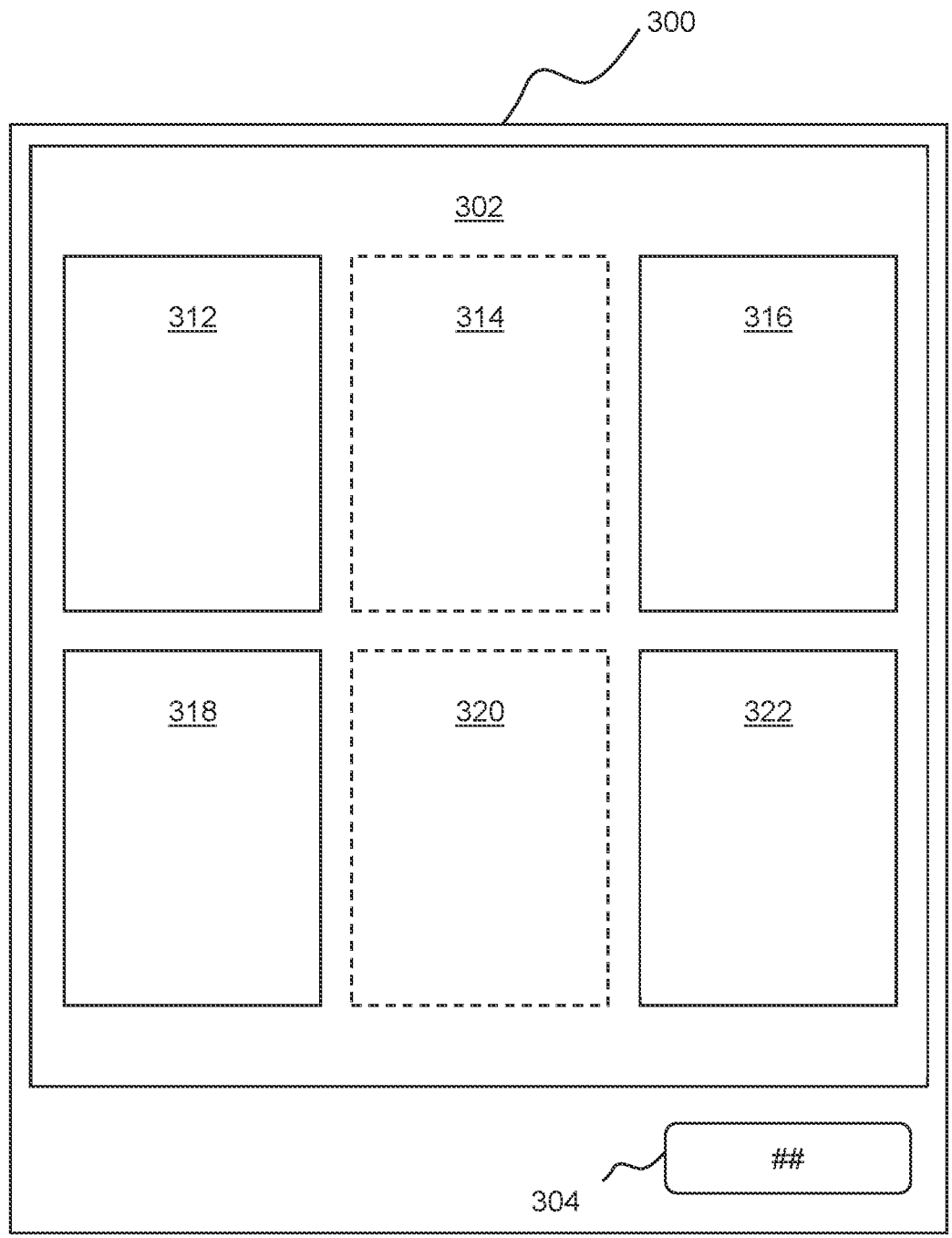
FIG. 3B illustrates an example view of a graphical user interface.
Figure 3C:
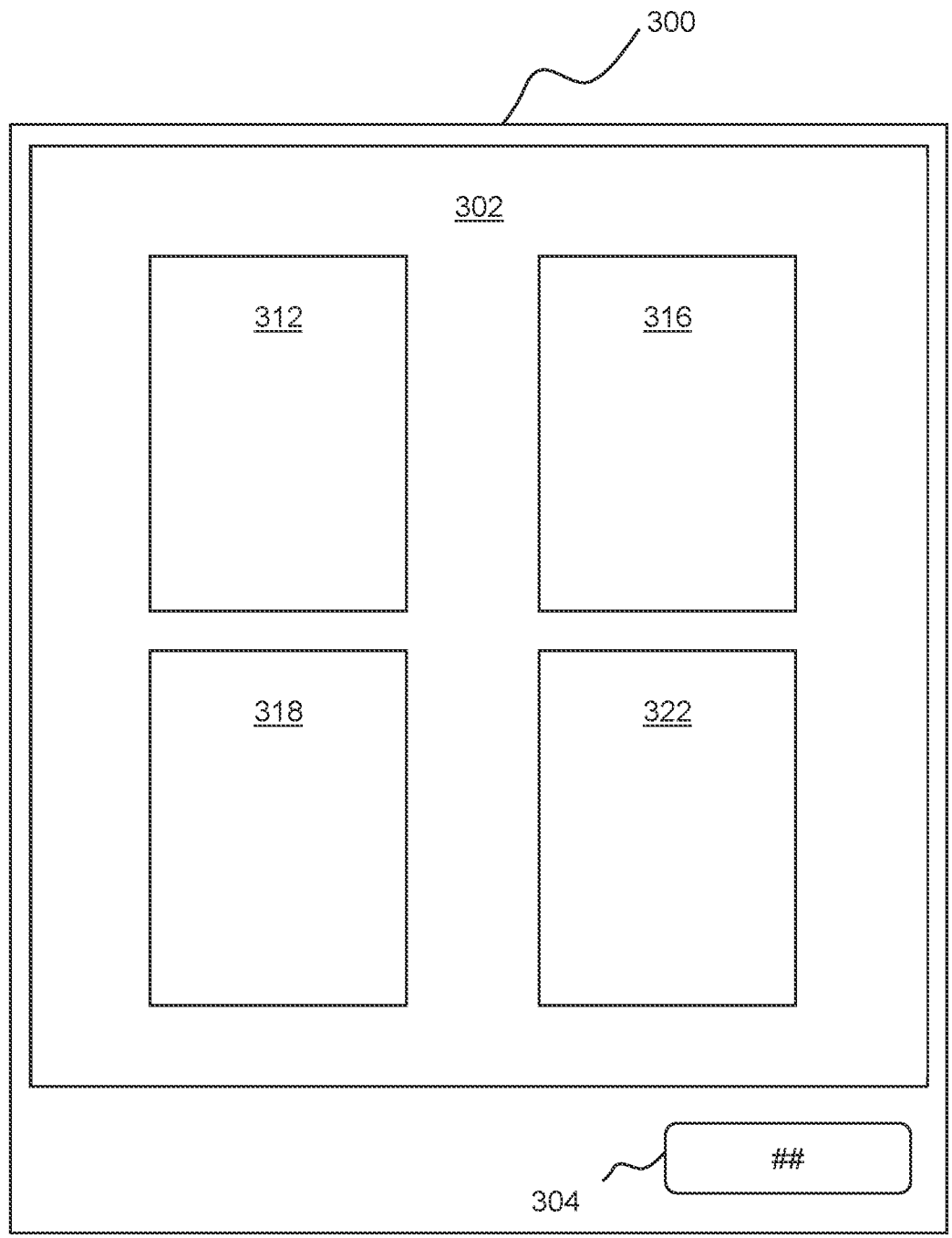
FIG. 3C illustrates an example view of a graphical user interface.

FIGS. 3A, 3B, and 3C illustrate example views of a graphical user interface 300. The views of the graphical user interface 300 in FIGS. 3A, 3B, and 3C are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, and/or 3C. Other graphical user interfaces are contemplated.

Referring to FIG. 3A, the graphical user interface 300 may include a display section 302. The display section 302 may include presentation of one or more videos (visual content of video(s)). The display section 302 may include presentation of one or more punchouts of a video. For example, in FIG. 3A, the display section 302 may include up to six different punchouts 312, 314, 316, 318, 320, 322 of a video. Other numbers of punchouts of a video are contemplated.

The graphical user interface 300 may include a punchout-number element 304. The punchout-number element 304 may enable a user to set the number of punchouts of a video to be included/enabled in the display section 302. A user may interact with the punchout-number element 304 to specify how many punchouts of the video should be presented within the display section 302. For example, in FIG. 3A, a user may have interacted with the punchout-number element 304 to set the number of punchouts to four. In response, the punchouts 312, 314, 316, 318 may be included/enabled within the display section 302 while the punchouts 320, 322 may not be included/enabled within the display section 302.

In some implementations, the punchout-number element 304 may enable a user to select specific punchouts of a video to be included/enabled in the display section 302. For example, the punchout-number element 304 may enable a user to select which of the punchouts 312, 314, 316, 318, 320, 322 are included/enabled in the display section 302.

In some implementations, the graphical user interface 300 may change to show only the punchouts that are included/enabled in the display section 302. For example, responsive to user selection of four punchouts, the graphical user interface 300 may change to the view shown in FIG. 3C. The punchouts 312, 316, 318, 322 selected for inclusion in the display section 302 may be rearranged within the display section 302. The size of the punchouts 312, 316, 318, 322 in the display section 302 may become larger since two of the punchouts have been removed from the display section 302. Other arrangement and/or changes in the punchouts are contemplated.

Figure 4:
FIG. 4 illustrates example punchout-number elements.
Figure 4:
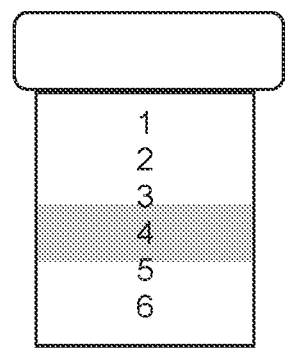
Figure 4:
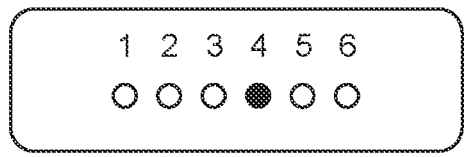
Figure 4:
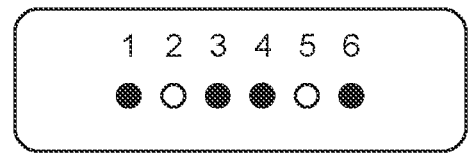

FIG. 4 illustrates example punchout-number elements 402, 404, 406, 408. The punchout-number element 402 may accept user input of a number, and the number input by the user may be used as the number of punchouts in the display section. The punchout-number element 402 may include a drop-down menu, and a user may select one of the listed options to set the number of punchouts in the display section. The punchout-number element 406 may include selectable buttons for different number of punchouts in the display section, and a user may select one of the buttons to set the number of punchouts in the display section. The punchout-number element 408 may include selectable buttons to enable different punchouts in the display section, and a user may select the button(s) of the punchout(s) to specify which punchout(s) are included in the display section.

While the punchout-number elements are shown as providing options to select up to six punchouts in FIG. 4, this is merely as an example and is not meant to be limiting. The punchout-number element may enable user selection of other number of punchouts in the display section. While the punchout-number elements are shown as identifying different punchouts using numbers, this is merely as an example and is not meant to be limiting. The punchout-number element may use other designations to identify different punchouts (e.g., F for front direction punchout, B for back direction punchout, R for right direction punchout, L for left direction punchout, T for top direction punchout, B for bottom direction punchout, C for custom direction punchout, TP for tiny planet punchout, etc.). Other punchout-number elements are contemplated.

In some implementations, a graphical user interface may further include a view direction element. The view direction element may refer to an interface element that visually represents the direction of a given punchout (direction of the video in which the given punchout is pointed/centered). The view direction element may refer to an interface element that is interactable by a user to input/control the direction of a given punchout. The view direction element may enable setting of a direction of a given punchout of the video included in the display section. For example, the view direction element may provide options to select the direction of a given punchout to be in a front direction, a back direction, a right direction, a left direction, a top direction, a bottom direction, a custom direction, and/or other direction.

A graphical user interface may include separate view direction elements for separate punchouts. For example, referring to FIG. 3C, the graphical user interface 300 may include separate view direction elements for punchout 312, 316, 318, 322. In some implementations, the graphical user interface 300 may include a view direction element for a selected punchout. For example, responsive to user selection of the punchout 312, a view direction element may be presented for the punchout 312. In some implementations, a view direction element for a punchout may be presented when user is editing/changing a punchout. For example, a user may interact with a punchout to edit/change the punchout. The graphical user interface may present one or more options, such as the view direction element, to edit/change the punchout.

In some implementations, a graphical user interface may further include a full-view element. The full-view element may refer to an interface element that visually represents the type of punchout view that is presented within the display section. The full-view element may refer to an interface element that is interactable by a user to input/control the type of punchout view that is presented within the display section. The full-view element may enable change in the display section between different types of punchout view. For example, the full-view element may enable change in the display section between presentation of multiple mini-view punchouts of a video and presentation of a full-view punchout of the video.

Presentation of multiple mini-view punchouts of a video may include a view in which different punchouts of the video are arranged within the display section. The different punchouts may be presented so that they are of same size and/or shape. For example, FIG. 3C shows an example presentation of multiple mini-view punchouts of a video, where the shape and size of the punchouts 312, 316, 318, 322 are the same.

Presentation of a full-view punchout of a video may include a view in which one of the punchouts is presented larger than other punchouts. Presentation of a full-view punchout of a video may include a view in which one of the punchouts is maximized within the display section. Presentation of a full-view punchout of a view may include a view in which one of the punchouts is presented larger/maximized, while other punchouts are presented as inset-view punchouts. The larger/maximized punchout may be referred to as a full-view punchout. An inset-view punchout may refer to a punchout that is shown within (completely within, partially within) another punchout (e.g., full-view punchout). An inset-view punchout may be positioned in front of a full-view punchout of the video.

Figure 5:
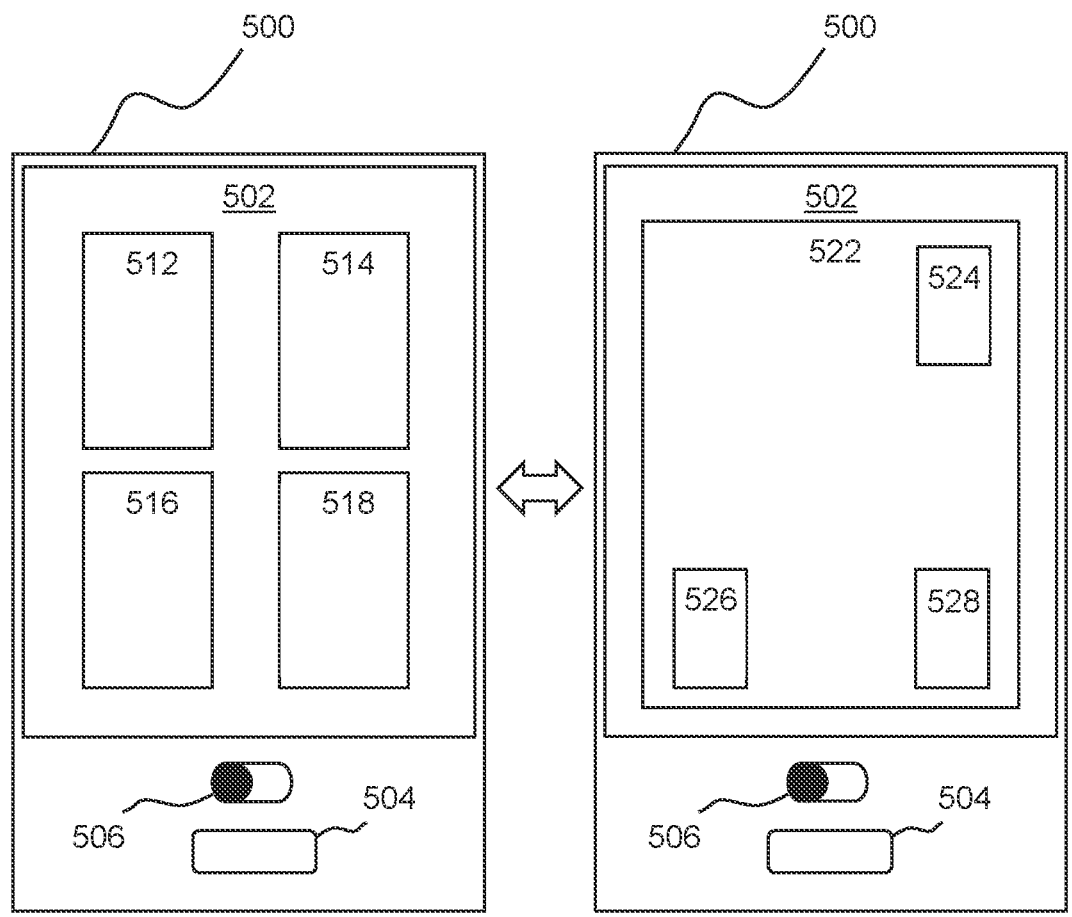
FIG. 5 illustrates example change of a graphical user interface between multiple mini-view punchouts of a video and a full-view punchout of the video with inset-view punchouts.

For example, FIG. 5 illustrates example change of a graphical user interface 500 between multiple mini-view punchouts of a video (left) and a full-view punchout of the video with inset-view punchouts (right). In the multiple mini-view punchouts of the video, a display section 502 may include punchouts 512, 514, 516, 518 that are of same shape and size. The graphical user interface 500 may include a punchout-number element 504 that enables setting of the number of punchouts in the display section 502. The graphical user interface 500 may include a full-view element 506. A user may interact with the full-view element 506 to change the display section 502 from including presentation of multiple mini-view punchouts of the view video to including presentation of a full-view punchout of the video, or vice versa. For example, a user may interact with the full-view element 506 to turn on the full-view, and the display section 502 may change to include a full-view punchout 522 and inset-view punchouts 524, 526, 528. The inset-view punchouts 524, 526, 528 of the video may be positioned in front of the full-view punchout 522 of the video. Change between other types of punchout view is contemplated.

In some implementations, the graphical user interface 500 may enable a user to select which punchout will be turned into a full-view punchout. For example, responsive to user selection of the punchout 512 before turning on the full-view, the display section 502 may change the punchout 512 into the full-view punchout 522, and change the punchouts 514, 516, 518 into the inset-view punchouts 524, 526, 528.

During the presentation of the full-view punchout of the video, function of the punchout-number element may change from enabling setting of the number of multiple mini-view punchouts of the video to enabling setting of a number of inset-view punchouts of the video. When the display section is presenting multiple mini-view punchouts of the video, the punchout-number element may enable a user to set how many punchouts are presented in the display section. When the display section is presenting a full-view punchouts of the video, the punchout-number element may enable a user to set how many inset-view punchouts are presented in the display section. For example, referring to FIG. 5, when the graphical user interface 500 is presenting the punchouts 512, 514, 516, 518, the punchout-number element 504 may visually represent the number of punchouts in the display section 502 with the number "4." A user may interact with the punchout-number element 504 to change how many punchouts are presented within the display section 502. When the graphical user interface 500 is presenting the full-view punchout 522 and the inset-view punchouts 525, 526, 528, the punchout-number element 504 may change to visually represent the number of inset punchouts in the display section 502 with the number "3." The full-view punchout 522 may not be counted in the number displayed by the punchout-number element 504. A user may interact with the punchout-number element 504 to change how many inset punchouts are presented within the display section 502.

In some implementations, the size, the shape, and/or the positions of the punchouts in the display section may modified based on user interaction with the punchouts. For example, a user may interact with a punchout (e.g., drag the edge) to make the punchout larger/smaller and/or change the dimension of the punchout. A user may interact with a punchout (e.g., click and drag) to change where the punchout is presented within the display section.

The user interaction component 106 may be configured to receive user interaction with one or more interface elements of the graphical user interface. Receiving user interaction with an interface element may include detecting, determining, discerning, discovering, finding, identifying, and/or other receiving user interaction with the interface element. Receiving user interaction with an interface element may include determining how the user interacted with the interface element. Receiving user interaction with an interface element may include interpreting user interaction with the interface element into one or more commands (e.g., command to set the number of punchouts in the display section, command to change between presentation of multiple mini-view punchouts to presentation of a full-view punchout). The user interaction component 106 may be configured to receive user interaction performed through one or more user interface devices (e.g., touchscreen display, keyboard, mouse, trackpad).

For example, the user interaction component 106 may be configured to receive user interaction with a punchout-number element to set the number of punchouts in the display section, user interaction with a view direction element to set the direction of a given punchout of the video included in the display section, user interaction with a full-view element to change the display section from including presentation of multiple mini-view punchouts of the video to including presentation of the full-view punchout of the video, or vice versa. Reception of user interaction with other interface elements is contemplated.

The modification component 108 may be configured to modify the graphical user interface(s). The modification component 108 may be configured to modify the display section and/or other sections. Modifying a graphical user interface may include changing one or more parts of the graphical user interface. Modifying a graphical user interface may include adding one or more new elements to the graphical user interface, removing one or more existing elements from the graphical user interface, changing one or more existing elements within the graphical user interface, and/or otherwise modifying the graphical user interface. In some implementations, modifying a graphical user interface may include replacing an existing graphical user interface with a new graphical user interface.

The modification component 108 may be configured to modify the graphical user interface(s) based on the user interaction with the interface element(s) of the graphical user interface and/or other information. For example, the modification component 108 may be configured to modify the display section to include presentation of the number of punchouts of the video set based on the user interaction with the punchout-number element and/or other information. The modification component 108 may be configured to modify the direction of a punchout of the video included in the display section based on the user interaction with the view direction element for the punchout and/or other information. The modification component 108 may be configured to modify the display section to change from including presentation of multiple mini-view punchouts of the video to including presentation of full-view punchout of the video, or vice versa, based on the user interaction with the full-view element and/or other information. Other modification of the graphical user interface is contemplated.

In some implementations, playback of multiple punchouts of the video may be synchronized. The graphical user interface may include a playback element that enables a user to cause/pause playback of the video. Different views of the video presented within different punchouts may be synchronized so that the graphical user interface provides synchronized views of different spatial parts of the video. Multiple synchronized perspectives of the video may be shown within the graphical user interface.

Multiple punchouts of the video may be synchronized based on origination of the separate punchouts from the same video. Multiple punchout that are presented within the graphical user interface may originate from a single source video, and thus the multiple punchouts may be synchronized without any need for processing/analysis to synchronize different punchouts. For example, because multiple punchouts originate from the same video, there is no need to analyze different punchouts to identify moments in different punch outs that correspond to the same time points and adjust punchout playback to match same time points.

Multiple punchouts of the video being synchronized may include separate views of the video presented within different punchouts being time-synchronized. Separate views of the video being time-synchronized may include the separate views including the same temporal parts of the video at the same time. Separate views of the video being time-synchronized may include the separate views including the same time points of the video (e.g., all views presenting different spatial parts of the video at 1:00 minute mark).

Multiple punchouts of the video being synchronized may include separate views of the video presented within different punchouts being frame-synchronized. Separate views of the video being frame-synchronized may include the separate views including spatial parts of the same video frame at the same time. Separate views of the video being frame-synchronized may include the separate views originating from the same source video frame of the video (e.g., all views presenting different spatial parts of the 100th video frame of the video).

In some implementations, the arrangements of punchouts within the graphical user interface may be saved. The saved arrangement may be used to present multi-punchout view of the video for playback. The saved arrangement may be used to present multi-punchout view of the video for editing.

In some implementations, multiple punchouts of the video included in the display section may be used to generate a video edit. A video edit may include one or more temporal parts of the video. A video edit may include one or more spatial parts of the video. A video edit may include one or more modified parts of the video. For example, one or more parts of the video may be modified by changing the visual characteristic of the part(s) (e.g., via application of visual effects) and/or temporal characteristics of the part(s) (e.g., via application of time change).

Multiple punchouts of the video included in the display section may be represented, defined, stored, manipulated, and/or otherwise interactable within different video tracks. For example, the display section may include multiple punchouts of a single video. When a user interacts with the graphical user interface to edit the video, individual punchouts of the single video may be represented as different video tracks. Separate timeline representations of separate punchouts may be presented.

In some implementations, multiple punchouts of the video included in the display section may be selectable and/or editable as a single video for inclusion in one or more video edits. Selection and/or editing of a segment (temporal part) of one punchout for inclusion in a video edit may be automatically applied to corresponding segments of other punchouts for inclusion in the video edit. When one segment of a punchout is selected for inclusion in a video edit, the corresponding segments (same temporal parts) of other punchouts may be selected for inclusion in the video edit. When one segment of a punchout is modified (e.g., via application of visual effects and/or time change), the corresponding segment of other punchouts may be modified the same way for inclusion in the video edit.

In some implementations, individual punchouts of the video included in the display section may be selectable and/or editable as separate videos for inclusion in one or more video edits. Selection and/or editing of a segment of one punchout for inclusion in a video edit may not be automatically applied to corresponding segment of other punchouts for inclusion in the video edit. Individual punchouts may be treated as separate videos when being selected/modified for inclusion in a video edit.

Figure 6:
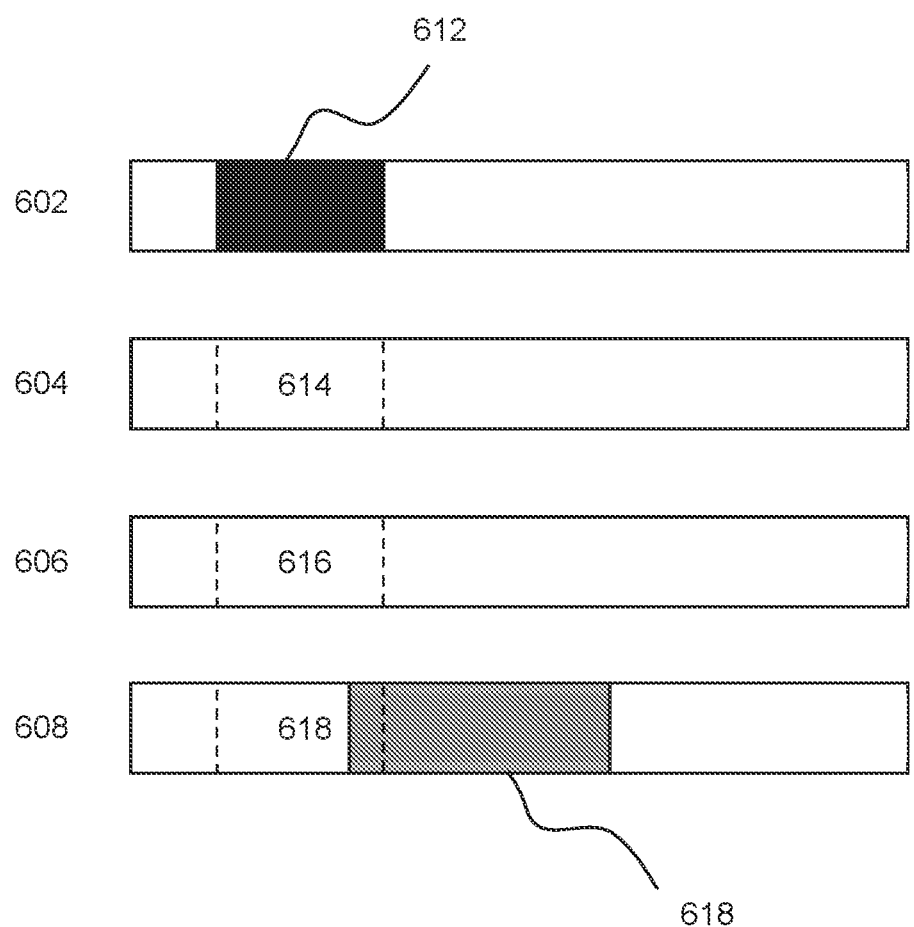
FIG. 6 illustrates example selection and modification of different punchouts of a video for inclusion in a video edit.

FIG. 6 illustrates example selection and modification of different punchouts of a video for inclusion in a video edit. Bars 602, 604, 606, 608 may represent progress length of four different punchouts of a video. The bars 602, 604, 606, 608 may include timeline representations of four different punchouts of the video. A segment 612 of the first punchout may be selected for inclusion in a video edit. Selection of the segment 612 of the first punchout may not result in selection of corresponding segments 614, 616, 618 of other punchouts for inclusion in the video edit. A segment 618 of the fourth punchout may be modified for inclusion in a video edit. Modification of the segment 618 of the fourth punchout may not result in modification of corresponding segments of other punchouts for inclusion in the video edit.

In some implementations, the graphical user interface may include separate timeline representations of separate punchouts of the video and a timeline representation of the video. Separate timeline representations of separate punchouts may enable a user to select and/or edit individual punchouts of the video as separate videos for inclusion in one or more video edits. The timeline representation of the video may enable a user to select and/or edit multiple punchouts of the video as a single video for inclusion in one or more videos.

For example, if a user wishes to select/edit a segment of one punchout for inclusion in a video edit, the user may interact with the timeline representation of the one punchout to mark the segment for selection/editing. User's marking of the segment through the timeline representation of a single punchout may select/edit only the segment of the single punchout. If the user wishes to select/edit the same segment of all punchouts for inclusion in a video edit, the user may interact with the timeline representation of the video to mark the segment for selection/editing. User's marking of the segment through the timeline representation of the video may select/edit the same segment of all punchouts of the video.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
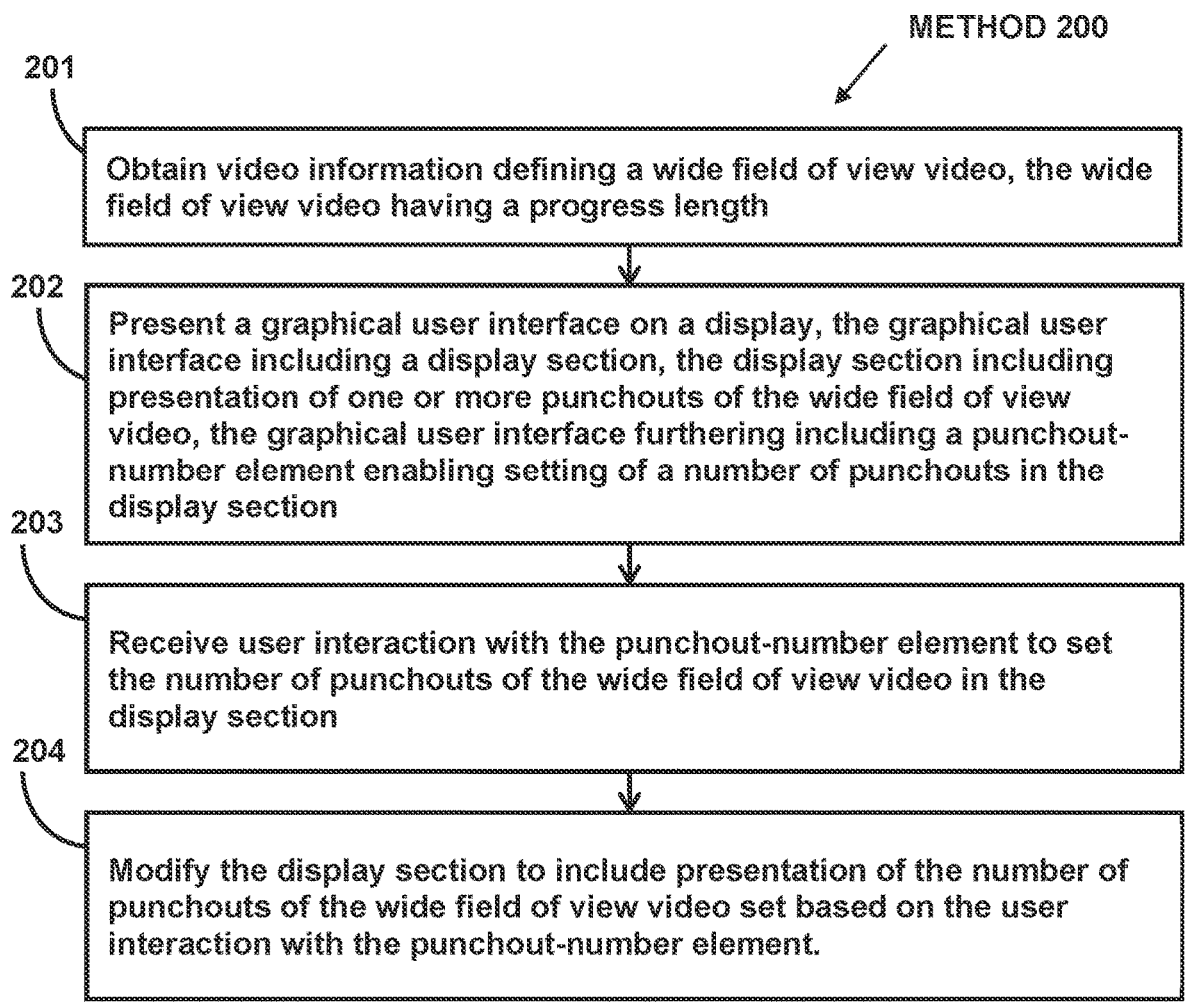
FIG. 2 illustrates a method for presenting wide videos.

FIG. 2 illustrates method 200 for presenting wide videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a wide field of view video. The wide field of view video may have a progress length. In some implementations, operation 201 may be performed by a processor component the same as or similar to the video component 102 (Shown in FIG. 1 and described herein).

At operation 202, a graphical user interface may be presented on a display. The graphical user interface may include a display section. The display section may include presentation of one or more punchouts of the wide field of view video. The graphical user interface may further include a punchout-number element. The punchout-number element may enable setting of a number of punchouts in the display section. In some implementations, operation 202 may be performed by a processor component the same as or similar to the graphical user interface component 104 (Shown in FIG. 1 and described herein).

At operation 203, user interaction with the punchout-number element to set the number of punchouts in the display section may be received. In some implementations, operation 203 may be performed by a processor component the same as or similar to the user interaction component 106 (Shown in FIG. 1 and described herein).

At operation 204, the display section may be modified to include presentation of the number of punchouts of the wide field of view video set based on the user interaction with the punchout-number element. In some implementations, operation 204 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting wide videos, the system comprising:
   one or more physical processors configured by machine-readable instructions to:
   obtain video information defining a wide field of view video, the wide field of view video having a progress length;
   present a graphical user interface on a display, the graphical user interface including a display section, the display section including presentation of one or more punchouts of the wide field of view video, the graphical user interface further including a punchout-number element enabling setting of a number of punchouts in the display section and a view direction element enabling setting of a direction of a given punchout of the wide field of view video included in the display section;

receive user interaction with the punchout-number element to set the number of punchouts in the display section; and modify the display section to include presentation of the number of punchouts of the wide field of view video set based on the user interaction with the punchout-number element, wherein playback of multiple punchouts of the wide field of view video is synchronized;

wherein:
individual punchouts of the wide field of view video included in the display section are selectable and/or editable as separate videos for inclusion in a video edit;

the display section includes a first punchout of the wide field of view video and a second punchout of the wide field of view video;

selection of a segment of the first punchout of the wide field of view video for inclusion in the video edit does not result in selection of a corresponding segment of the second punchout of the wide field of view video for inclusion in the video edit; and modification of the segment of the first punchout of the wide field of view video for inclusion in the video edit does not result in modification of the corresponding segment of the second punchout of the wide field of view video for inclusion in the video edit.

2. A system for presenting wide videos, the system comprising:
one or more physical processors configured by machine-readable instructions to:
obtain video information defining a wide field of view video, the wide field of view video having a progress length;

present a graphical user interface on a display, the graphical user interface including a display section, the display section including presentation of one or more punchouts of the wide field of view video, the graphical user interface further including a punchout-number element enabling setting of a number of punchouts in the display section and a full-view element enabling change in the display section from including presentation of multiple mini-view punchouts of the wide field of view video to including presentation of a full-view punchout of the wide field of view video;

receive user interaction with the punchout-number element to set the number of punchouts in the display section; and modify the display section to include presentation of the number of punchouts of the wide field of view video set based on the user interaction with the punchout-number element;

wherein during the presentation of the full-view punchout of the wide field of view video, function of the punchout-number element changes from enabling setting of the number of multiple mini-view punchouts of the wide field of view video to enabling setting of a number of inset-view punchouts of the wide field of view video, the inset-view punchouts of the wide field of view video positioned in front of the full-view punchout of the wide field of view video.

3. The system of claim 2, wherein individual punchouts of the wide field of view video included in the display section are selectable and/or editable as separate videos for inclusion in a video edit.

4. The system of claim 2, wherein the wide field of view video includes a spherical video having a spherical field of view.

5. The system of claim 2, wherein playback of multiple punchouts of the wide field of view video is synchronized.

6. A system for presenting wide videos, the system comprising:
one or more physical processors configured by machine-readable instructions to:
obtain video information defining a wide field of view video, the wide field of view video having a progress length;

present a graphical user interface on a display, the graphical user interface including a display section, the display section including presentation of one or more punchouts of the wide field of view video, the graphical user interface further including a punchout-number element enabling setting of a number of punchouts in the display section;

receive user interaction with the punchout-number element to set the number of punchouts in the display section; and modify the display section to include presentation of the number of punchouts of the wide field of view video set based on the user interaction with the punchout-number element;

wherein:
individual punchouts of the wide field of view video included in the display section are selectable and/or editable as separate videos for inclusion in a video edit;

the display section includes a first punchout of the wide field of view video and a second punchout of the wide field of view video;

selection of a segment of the first punchout of the wide field of view video for inclusion in the video edit does not result in selection of a corresponding segment of the second punchout of the wide field of view video for inclusion in the video edit; and modification of the segment of the first punchout of the wide field of view video for inclusion in the video edit does not result in modification of the corresponding segment of the second punchout of the wide field of view video for inclusion in the video edit.

7. The system of claim 6, wherein the wide field of view video includes a spherical video having a spherical field of view.

8. The system of claim 7, wherein the graphical user interface further includes a view direction element enabling setting of a direction of a given punchout of the wide field of view video included in the display section.

9. The system of claim 8, wherein the view direction element provides options to select the direction of the given punchout to be in a front direction, a back direction, a right direction, a left direction, a top direction, a bottom direction, and a custom direction.

10. The system of claim 6, wherein playback of multiple punchouts of the wide field of view video is synchronized.

11. The system of claim 6, wherein the graphical user interface further includes a full-view element enabling change in the display section from including presentation of multiple mini-view punchouts of the wide field of view video to including presentation of a full-view punchout of the wide field of view video.

12. A method for presenting wide videos, the method performed by a computing system including one or more processors, the method comprising:
obtaining, by the computing system, video information defining a wide field of view video, the wide field of view video having a progress length;
presenting, by the computing system, a graphical user interface on a display, the graphical user interface including a display section, the display section including presentation of one or more punchouts of the wide field of view video, the graphical user interface further including a punchout-number element enabling setting of a number of punchouts in the display section and a full-view element enabling change in the display section from including presentation of multiple mini-view punchouts of the wide field of view video to including presentation of a full-view punchout of the wide field of view video;
receiving, by the computing system, user interaction with the punchout-number element to set the number of punchouts in the display section; and
modifying, by the computing system, the display section to include presentation of the number of punchouts of the wide field of view video set based on the user interaction with the punchout-number element;
wherein during the presentation of the full-view punchout of the wide field of view video, function of the punchout-number element changes from enabling setting of the number of multiple mini-view punchouts of the wide field of view video to enabling setting of a number of inset-view punchouts of the wide field of view video, the inset-view punchouts of the wide field of view video positioned in front of the full-view punchout of the wide field of view video.

13. The method of claim 12, wherein individual punchouts of the wide field of view video included in the display section are selectable and/or editable as separate videos for inclusion in a video edit.

14. The method of claim 12, wherein playback of multiple punchouts of the wide field of view video is synchronized.

15. A method for presenting wide videos, the method performed by a computing system including one or more processors, the method comprising:
obtaining, by the computing system, video information defining a wide field of view video, the wide field of view video having a progress length;
presenting, by the computing system, a graphical user interface on a display, the graphical user interface including a display section, the display section including presentation of one or more punchouts of the wide field of view video, the graphical user interface further including a punchout-number element enabling setting of a number of punchouts in the display section;
receiving, by the computing system, user interaction with the punchout-number element to set the number of punchouts in the display section; and
modifying, by the computing system, the display section to include presentation of the number of punchouts of the wide field of view video set based on the user interaction with the punchout-number element
wherein:
individual punchouts of the wide field of view video included in the display section are selectable and/or editable as separate videos for inclusion in a video edit;
the display section includes a first punchout of the wide field of view video and a second punchout of the wide field of view video;
selection of a segment of the first punchout of the wide field of view video for inclusion in the video edit does not result in selection of a corresponding segment of the second punchout of the wide field of view video for inclusion in the video edit; and
modification of the segment of the first punchout of the wide field of view video for inclusion in the video edit does not result in modification of the corresponding segment of the second punchout of the wide field of view video for inclusion in the video edit.

16. The method of claim 15, wherein the wide field of view video includes a spherical video having a spherical field of view.

17. The method of claim 16, wherein the graphical user interface further includes a view direction element enabling setting of a direction of a given punchout of the wide field of view video included in the display section.

18. The method of claim 17, wherein the view direction element provides options to select the direction of the given punchout to be in a front direction, a back direction, a right direction, a left direction, a top direction, a bottom direction, and a custom direction.

19. The method of claim 15, wherein playback of multiple punchouts of the wide field of view video is synchronized.

20. The method of claim 15, wherein the graphical user interface further includes a full-view element enabling change in the display section from including presentation of multiple mini-view punchouts of the wide field of view video to including presentation of a full-view punchout of the wide field of view video.

* * * * *